United States Patent
Sarawate et al.

(10) Patent No.: US 12,270,306 B2
(45) Date of Patent: Apr. 8, 2025

(54) ENGINE COMPONENT WITH ABRADABLE MATERIAL AND TREATMENT

(71) Applicant: General Electric Company, Schenectady, NY (US)

(72) Inventors: Neelesh Sarawate, Pleasanton, CA (US); Stephan Priebe, Niskayuna, NY (US); Wojciech Sak, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/552,294

(22) Filed: Dec. 15, 2021

(65) Prior Publication Data

US 2023/0184125 A1    Jun. 15, 2023

(51) Int. Cl.
*F01D 11/12* (2006.01)
*F01D 25/24* (2006.01)

(52) U.S. Cl.
CPC ............ *F01D 11/122* (2013.01); *F01D 25/24* (2013.01); *F05D 2230/31* (2013.01); *F05D 2230/90* (2013.01); *F05D 2240/14* (2013.01); *F05D 2240/55* (2013.01); *F05D 2250/294* (2013.01); *F05D 2300/6111* (2013.01)

(58) Field of Classification Search
CPC ...... F01D 11/122; F01D 25/005; F01D 25/24; F05D 2240/12; F05D 2250/294
See application file for complete search history.

(56) References Cited

U.S. PATENT DOCUMENTS

| | | | | |
|---|---|---|---|---|
| 4,764,089 | A * | 8/1988 | Strangman | ............ F01D 11/122 415/196 |
| 5,308,225 | A * | 5/1994 | Koff | ........................ F01D 11/08 415/58.7 |
| 6,832,890 | B2 | 12/2004 | Booth | |
| 7,766,614 | B2 | 8/2010 | Northfield | |
| 8,177,494 | B2 | 5/2012 | Ward et al. | |
| 8,251,648 | B2 | 8/2012 | Johann | |
| 10,107,307 | B2 * | 10/2018 | Urac | ..................... F04D 29/526 |
| 10,247,027 | B2 * | 4/2019 | Rioux | .................... F04D 29/526 |
| 10,494,945 | B2 * | 12/2019 | Grande | ................... C23C 4/126 |
| 10,539,154 | B2 | 1/2020 | Mallina et al. | |
| 10,648,484 | B2 | 5/2020 | Gentry et al. | |
| 10,876,423 | B2 | 12/2020 | Reynolds et al. | |
| 11,015,465 | B2 | 5/2021 | Reynolds et al. | |
| 11,215,070 | B2 * | 1/2022 | Urac | ..................... F01D 11/122 |
| 11,346,367 | B2 * | 5/2022 | Yu | ......................... F04D 29/681 |
| 2007/0147989 | A1 | 6/2007 | Collins | |

(Continued)

*Primary Examiner* — Brian P Wolcott
(74) *Attorney, Agent, or Firm* — HANLEY, FLIGHT & ZIMMERMAN, LLC (57) ABSTRACT

An engine component with an abradable material and treatment is disclosed herein. An example engine component includes a substrate having a first thickness and defining at least a first substrate surface, the substrate extending along an axial direction, an abradable material on the first substrate surface, the abradable material defining a first abradable material surface, a second abradable material surface spaced radially apart from the first abradable material surface and defining a second thickness, and a treatment, the treatment extending from the first abradable material surface through at least a portion of the first thickness of the substrate.

22 Claims, 6 Drawing Sheets

(56) References Cited

U.S. PATENT DOCUMENTS

| | | | |
|---|---|---|---|
| 2008/0044273 A1* | 2/2008 | Khalid | F04D 29/526 |
| | | | 415/57.4 |
| 2018/0010469 A1* | 1/2018 | Kadau | F01D 5/186 |
| 2021/0054761 A1 | 2/2021 | Reynolds et al. | |
| 2021/0180467 A1 | 6/2021 | Urac | |
| 2021/0188721 A1* | 6/2021 | Shi | C04B 41/89 |

\* cited by examiner

ENGINE COMPONENT WITH ABRADABLE MATERIAL AND TREATMENT

FIELD OF THE DISCLOSURE

This disclosure relates generally to turbine engines and, more particularly, to an engine component with abradable material and treatment.

BACKGROUND

Turbine engines are some of the most widely-used power generating technologies, often being utilized in aircraft and power-generation applications. A turbine engine generally includes a fan and a core arranged in flow communication with one another. The core of the turbine engine generally includes, in serial flow order, a compressor section, a combustion section, a turbine section on the same shaft as the compressor section, and an exhaust section. Typically, a casing or housing surrounds the core of the turbine engine. Similarly, the same or a separate casing or housing typically surrounds the fan. The turbine engine works by drawing in atmospheric air through the front of the turbine engine with the fan and forcing the atmospheric air through the sections of the core.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In some examples used herein, the term "substantially" is used to describe a relationship between two parts that is within three degrees of the stated relationship (e.g., a substantially collinear relationship is within three degrees of being linear, a substantially perpendicular relationship is within three degrees of being perpendicular, a substantially parallel relationship is within three degrees of being parallel, etc.). As used herein, a dimension (e.g., thickness, depth, etc.) is substantially equal if the dimension has a measurement that varies within 10% of the average measurement of the dimension.

The terms "upstream" and "downstream" refer to the relative direction with respect to fluid flow in a fluid pathway. For example, "upstream" refers to the direction from which the fluid flows, and "downstream" refers to the direction to which the fluid flows. Various terms are used herein to describe the orientation of features. In general, the attached figures are annotated with reference to the axial direction, radial direction, and circumferential direction of the vehicle associated with the features, forces and moments. In general, the attached figures are annotated with a set of axes including the axial axis A, the radial axis R, and the circumferential axis C.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

A turbine engine, also referred to herein as a gas turbine engine, is a type of internal combustion engine that uses atmospheric air as a moving fluid. In operation, atmospheric air enters through the front of the turbine engine with a fan and is fed to a compressor. The compressor section of the turbine engine is responsible for providing a sufficient quantity of compressed air to downstream sections of the core in an efficient manner. As the atmospheric air flows through the compressor section, one or more compressors (e.g., axial compressors, centrifugal compressors, etc.) progressively compress the air until it reaches the combustion section.

A turbine engine compressor generally includes consecutive compressor stages in serial flow. However, some turbine engine compressors include a single compressor stage. A compressor stage includes a rotor hub (e.g., also referred to as a rotor, a hub, etc.) having an array rotor blades and a stator with corresponding stator vanes. As disclosed herein, a blade may refer to a rotor blade and/or a stator vane. The hub may be positioned concentrically about and coaxially along a longitudinal axis, for example. As the rotor hub turns at a high speed, the rotor blades spin and impel the air downstream through the various compressor stages. As air flows through the compressor, the consecutive compressor stages compress the air further. Because the compressor imparts work on the airflow across an adverse pressure gradient (e.g., the air is forced towards higher-pressure zones), compressors are prone to instability issues.

As noted above, at least one casing typically surrounds the sections of the turbine engine. An area between the casing and the hub defines a flow passage for airflow through the turbine engine. The casing experiences a variety of loads, such as thermal loads, pressure loads, and mechanical loads, which influence tip clearance. Tip clearance as disclosed herein refers to a distance between a tip of a blade (e.g., a rotating blade such as a compressor rotor blade, fan rotor blade, etc. and/or a stator vane) and another engine component positioned at the blade tip (e.g., a casing, a hub, etc.). Over a time period of engine operation, tip clearance varies due to rotor growth and casing growth, e.g., through rotational speed of the rotor and thermal expansion of the rotating components and the casing. Over an operational period of the turbine engine, the tip clearance transitions between a relatively large clearance and a relatively small clearance, which can negatively impact compressor operability and stability, increase transient loss of component efficiencies, and increase tendency for tip rubbing. In some instances, for example, tip clearance between a blade and an engine component is substantially non-existent. In such examples, the blade may rub against the engine component, thereby damaging the engine component and/or damaging the blade tip. In some instances, a tip clearance that is relatively large can lead to tip leakage flow. Tip leakage flow as disclosed herein refers to air flow losses in the casing region associated with the rotor blade and/or in the hub region associated with the stator vane.

The flow field of air in the tip region (e.g., rotor blade tip region and/or stator vane tip region) of the compressor is relatively complex due to interactions of tip leakage flow with the mainstream flow and other secondary flows. These interactions can lead to decreased efficiency and negatively impact compressor stability. For example, tip flow leakage can result in compressor instabilities such as stall and surge. Compressor stall is a circumstance of abnormal airflow resulting from the aerodynamic stall of the rotor blades within the compressor. Compressor stall causes the air flowing through the compressor to slow down or stagnate. In some cases, the disruption of air flow as the air passes through various stages of the compressor can lead to compressor surge. Compressor surge refers to a stall that results in the complete disruption of the airflow through the compressor. The operating range of a compressor can be characterized by a stall margin of the compressor. The stall margin of a compressor is defined as a difference between an operating rotations per minute (RPM) of the compressor rotor blades and an RPM at which the compressor rotor blades will stall at a given altitude. A determining factor of stall margin and, more generally, the aerodynamic performance of a compressor involves the region of the compressor at the blade tips (e.g., tip region).

Geometric modifications to an engine component (e.g., casing, hub, etc.), such as a treatment (e.g., casing treatment, etc.), can be integrated to improve air flow quality through the turbine engine with minimal impact to efficiency. Treatments as disclosed herein are grooves (e.g., slots, cavities, etc.) fabricated into a surface of a component, such as an inner surface of a rotor casing (e.g., a compressor casing, fan casing, etc.) and/or an outer surface of a hub (e.g., a compressor hub, a fan hub, etc.). In some examples, a treatment is fabricated into an inner surface of a casing near the tip region. In some examples, a treatment is fabricated into an outer surface of the hub near a stator vane tip. The treatment may reduce blockage of airflow in the tip region and may allow airflow to recirculate in the treatment before being reinjected into the main flow path.

A treatment can be integrated into a compressor casing, a fan casing, and/or a hub to improve the operating range and stability of the compressor. Specifically, a treatment can increase the aerodynamic operability of the compressor by increasing stall margin. However, a treatment does not manage tip clearance. Tip flow leakage may continue at moments when tip clearance is large. Further, a treatment does not prevent a rotor blade tip and/or stator vane tip from rubbing against a respective engine component (e.g., casing and/or hub), thereby damaging the engine component and/or the blade. Accordingly, a new engine component for a turbine engine is desirable.

Examples disclosed herein enable the manufacturing of an example hybrid engine component having an abradable material and treatment. In examples disclosed herein, the hybrid engine component includes an substrate having at least a first surface. In some examples, the substrate is manufactured using die casting. However, other suitable techniques may be used such as additive manufacturing techniques, etc. In examples disclosed herein, the hybrid engine component includes an abradable material that coats the first surface of the substrate and a treatment fabricated into the first surface of the substrate having the abradable material.

In some examples disclosed herein, the hybrid engine component is a casing, and may surround a portion of a turbine engine having the rotor hub and rotor blades, such as a compressor section, a fan section, and/or a turbine section. In such examples, the substrate has a second surface that is radially spaced apart from the inner surface. The first surface is an inner surface of the substrate, which is spaced radially inward from the second (e.g., outer) surface of the substrate. The rotor blade(s) may have a leading edge, which is the upstream edge of the blade that first encounters the oncoming flow, and a trailing edge which is the downstream edge of the blade. In some examples, the abradable material is thicker near the leading edge of the rotor blade. For example, the abradable material may be thicker near a region of the casing where the leading edge of the rotor blade interacts to help minimize tip clearance near the leading edge. In some examples, the treatment is fabricated at the leading edge of the rotor blade. In some examples, the treatment extends upstream of the leading edge of the rotor.

In some examples disclosed herein, the hybrid engine component is a hub, and may be surrounded by a portion of the turbine engine having a stator and stator vanes, such as a compressor section. In such examples, the first surface is the outermost surface of the substrate. In some such examples, the abradable material has a constant thickness. In certain examples, the abradable material thickness may vary along the area of the hub at which the stator vane rests.

In examples disclosed herein, the abradable material is applied to the first surface of the engine component. In some examples, the abradable material is thermally sprayed onto the first surface of the engine component. However, any suitable technique may be used to apply the abradable material additionally or alternatively, including electron beam physical vapor deposition (EBPVD), etc. In some examples, the abradable material is made of Nickel-graphite. However, the abradable material can be any suitable abradable material, including cobalt-nickel-chromium-aluminum-yttrium (CoNiCrAlY), etc. In examples disclosed herein, the blades can rub against the abradable material thereby abrading the abradable material coating. In some examples, the abradable material helps minimize or otherwise reduce tip clearance by allowing the blade tip to rub against the abradable material coating. In some examples, the abradable material prevents damage to the blade tip when the blade tip rubs against the abradable material coating. Accordingly, the hybrid engine component disclosed herein may help minimize or otherwise reduce tip clearance and/or prevent damage to the blade tip.

In examples disclosed herein, a treatment is machined and/or otherwise fabricated into the abradable material and the engine component. The treatment may include one or more grooves that are recessed radially into the abradable material and engine component. In some examples, the treatment fabricated into the abradable material and the substrate align and are colinear. In some examples, the treatment may be fabricated simultaneously in the abradable material and the engine component. Any suitable method for fabricating the treatment may be used, including subtractive manufacturing processes such as milling, drilling, chemical processing, etc.

Certain examples disclosed herein improve efficiency and operability of a turbine engine by integrating a hybrid engine component with abradable means (e.g., abradable coating) and treatment means (e.g., a treatment, casing treatment, etc.). Certain examples improve tip clearance management between the first surface of the engine component and a tip of a blade by applying an abradable material coating to the first surface of the engine component. In some examples, the abradable material reduces tip clearance thereby improving air flow through the turbine engine. In some examples, the abradable material protects a blade tip from damage if the blade tip rubs against the engine component because the abradable material coating can be rubbed away. Certain examples improve aerodynamic performance of the turbine engine by fabricating a treatment on an engine component having an abradable material coating. For example, fabricating a treatment may improve stall margin of the turbine engine thereby providing aerodynamic benefits. Accordingly, certain examples disclosed herein improve tip clearance management and extend stall-margin with minimal efficiency penalty.

Examples disclosed below are described in referenced to a hybrid engine component that is a casing (e.g., hybrid casing). It is understood that examples disclosed herein for the hybrid casing having the abradable material and treatment may additionally or alternatively be applied to a hub (e.g., a hybrid hub) of a turbine engine. For example, the hub may include an abradable material that coats the first surface of the hub. The abradable material may be applied to the first (e.g., outermost) surface of the hub in a region near the stator vane. Examples disclosed herein regarding the abradable material of the hybrid casing may additionally or alternatively be applied to the first surface of the hub. Further, a treatment may be machined onto the first surface of the hub having the abradable material coating. Examples disclosed herein regarding the treatment of the hybrid casing may additionally or alternatively be applied to the first surface of the hub. Similarly, benefits and/or advantages of the hybrid casing may be benefits and/or advantages of the hybrid hub.

Examples disclosed herein are discussed in connection with a hybrid engine component (e.g., hybrid casing) having an abradable material and treatment for various stages of the compressor. Additionally or alternatively, the hybrid engine component with abradable material and treatment as disclosed herein can be applied to other sections of the turbine engine, including the fan section (e.g. single stage fans, multi-stage fans, open rotor/unducted fans, etc.) and turbine section. Though examples disclosed herein are discussed in connection with a turbofan jet engine, it is understood that examples disclosed herein can be implemented in connection with a turbojet jet engine, a turboprop jet engine, a combustion turbine for power production, or any other suitable application. Further, it is understood that examples disclosed herein can be implemented in connected with turbine engines that have geared architectures, have more than two shafts, include multiple spools, etc.

Figure 1:
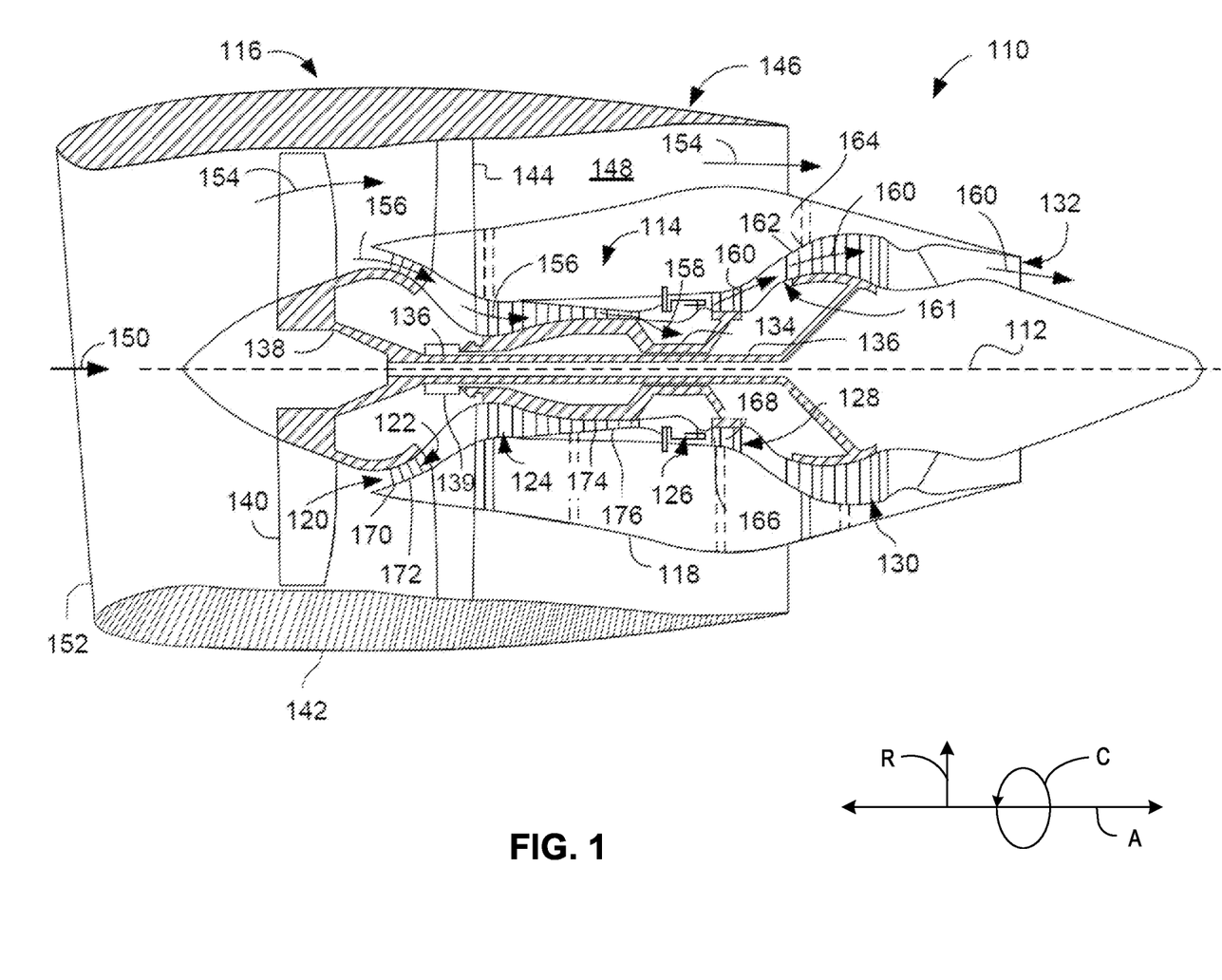
FIG. 1 is a schematic cross-sectional view of an example gas turbine engine in which examples disclosed herein may be implemented.

Referring now to the drawings, wherein identical numerals indicate the same elements throughout the figures, FIG. 1 is a schematic cross-sectional view of an example high-bypass turbofan-type gas turbine engine 110 ("turbofan engine 110"). While the illustrated example is a high-bypass turbofan engine, the principles of the present disclosure are also applicable to other types of engines, such as low-bypass turbofans, turbojets, turboprops, etc. As shown in FIG. 1, the turbofan engine 110 defines a longitudinal or axial centerline axis 112 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 112, the radial direction R is a direction that extends orthogonally outwardly from the centerline axis 112, and the circumferential direction C is a direction that extends concentrically around the centerline axis 112.

In general, the turbofan engine 110 includes a core turbine 114 disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low pressure compressor 122 ("LP compressor 122") and a high pressure compressor 124 ("HP compressor 124"), a combustion section 126, a turbine section having a high pressure turbine 128 ("HP turbine 128") and a low pressure turbine 130 ("LP turbine 130"), and an exhaust section 132. A high pressure shaft or spool 134 ("HP shaft 134") drivingly couples the HP turbine 128 and the HP compressor 124. A low pressure shaft or spool 136 ("LP shaft 136") drivingly couples the LP turbine 130 and the LP compressor 122. The LP shaft 136 can also couple to a fan spool or fan shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gearbox 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the annular inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gearbox 139) can be included between any shafts and spools. For example, the reduction gearbox 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130.

Figure 2:
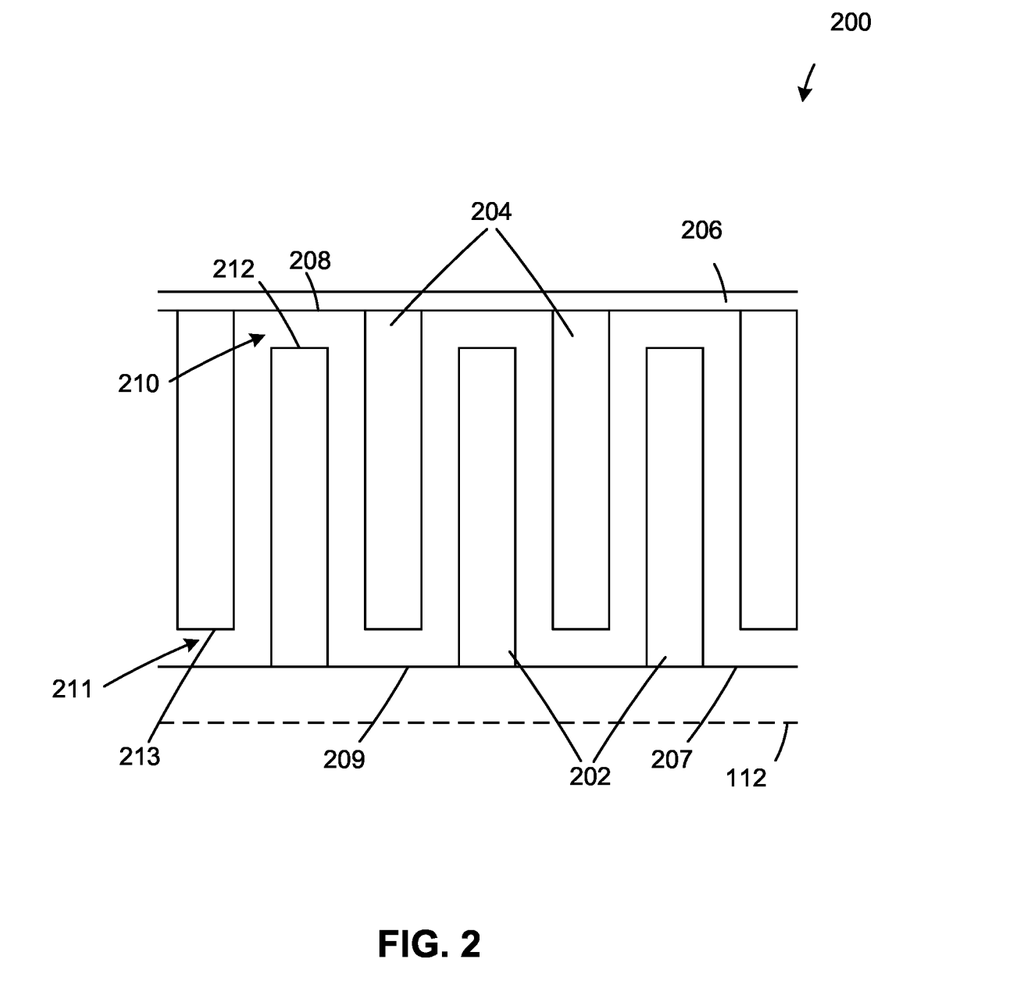
FIG. 2 is a schematic cross-sectional view of an example high pressure compressor section of another example turbine engine.

FIG. 2 is a schematic cross-sectional illustration of an example high pressure compressor (e.g., HP compressor) 200 of another example turbine engine above an axial centerline (e.g., centerline axis 112). The turbine engine may include additional compressor sections in some examples, such as another high pressure compressor section, a low pressure compressor section, etc. As noted above, the compressor is tasked with compressing a sufficient quantity of atmospheric air for the downstream sections of the turbine engine. Accordingly, the HP compressor 200 should operate as efficiently as possible to provide enough compressed air for the operation of the turbine engine.

The HP compressor 200 of FIG. 2 includes example rotor blades 202, example stator vanes 204, an example HP compressor casing 206, and an example HP compressor hub (e.g., hub) 207. The rotor blades 202 are spaced circumferentially around the hub 207 and extend radially outwards towards the HP compressor casing 206. In operation, the rotor blades 202 spin in a circumferential direction. The example HP compressor casing (e.g., casing) 206 of FIG. 2 includes an annular substrate having an outer annular substrate surface and an inner annular substrate surface (e.g., inner surface). In the illustrated example, the inner surface is an example first surface 208 that changes radius along the axial direction, sloping radially inward along the axial direction. In additional or alternative examples, the casing 206 may slope radially outward along the axial direction and/or may maintain a constant radius along the axial direction. In the illustrated example, the hub 207 is defined by an annular substrate having an outer annular surface (e.g., outer surface). In the illustrated example, the outer surface is an example first surface 209.

An example rotor blade tip region 210 is illustrated in a region of the casing 206 at an example rotor blade tip 212. An example stator vane tip region 211 is illustrated in a region of the hub 207 at an example stator vane tip 213. In operation, the casing 206 experiences significant loads that influence the tip region(s) 210, 211 and more specifically, a tip clearance. As illustrated in FIG. 2, the tip clearance is the distance between the rotor blade tip 212 and the first surface 208 of the casing 206 and/or between the stator vane tip 213 and the first surface 209 of the hub 207. In operation, the clearance between the blade tip 212, 213 and the first surface 208, 209 may transition between a relatively large clearance and relatively small clearance. For example, a large clearance may be between 4% to 10% of the axial cord. In some situations, the blade tip 212, 213 may rub against the first surface 208, 209. Further, the changes in tip clearance may affect the airflow through the HP compressor 200 resulting in instabilities. Accordingly, an example hybrid engine component would be beneficial to the HP compressor 200. Additionally or alternatively, the example hybrid engine component would be beneficial to other compressor sections as well as additional sections of the turbine engine, such as a fan section(s) and/or a turbine section(s).

Figure 3:
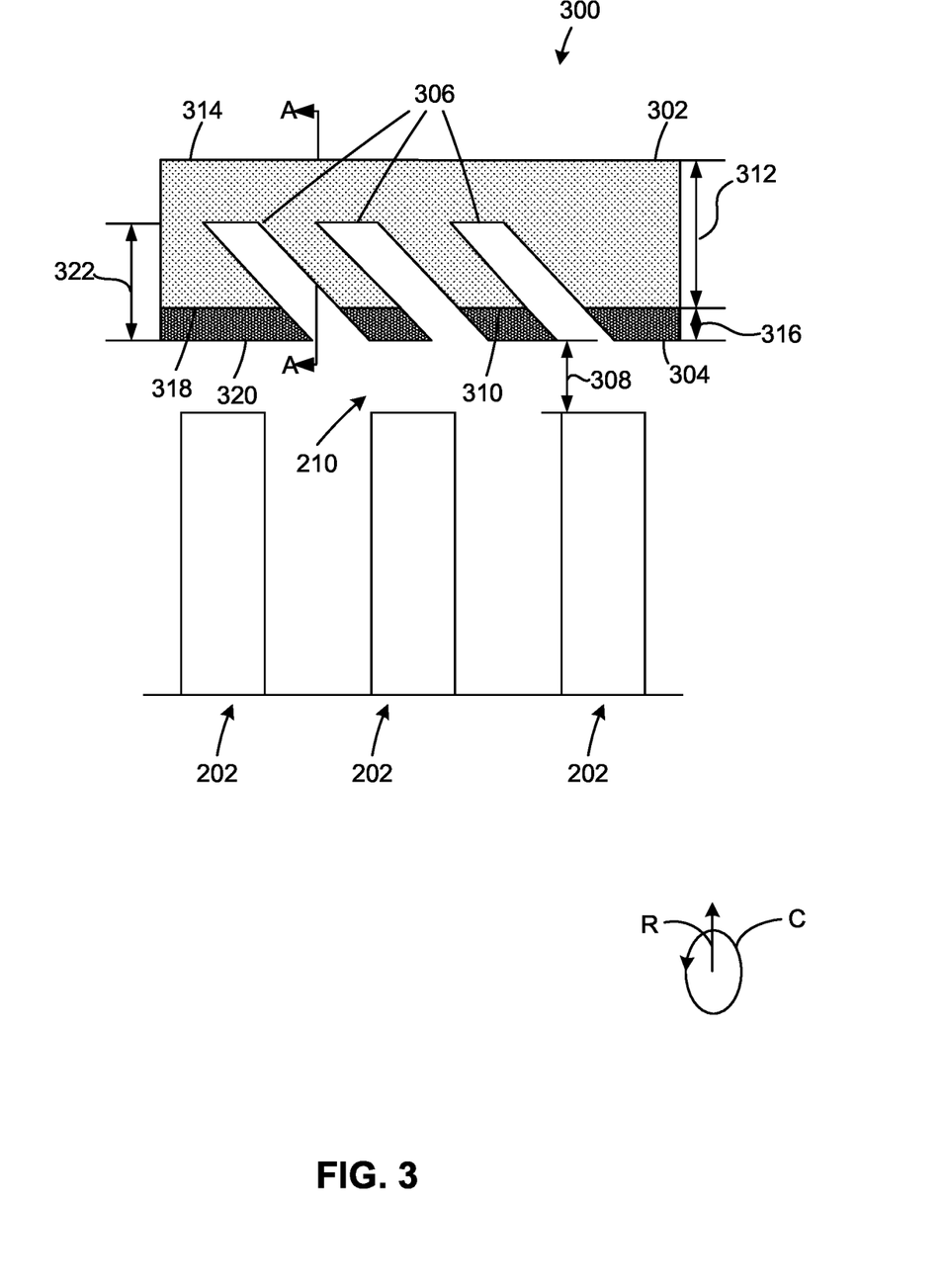
FIG. 3 is a partial circumferential view of an example hybrid casing with an abradable material and treatment in accordance with the teachings of this disclosure.

FIG. 3 illustrates an example hybrid casing 300 formed in accordance with the teachings of this disclosure. FIG. 3 includes a partial circumferential view of an example compressor (e.g., HP compressor 200) at a tip region of a rotor blade (e.g., tip region 210). For the sake of simplification, the illustrated example of FIG. 3 does not illustrate example stator vanes (e.g., stator vanes 204). However, it is understood that examples disclosed regarding the hybrid casing may additionally or alternatively be applied to an example hybrid hub at another tip region adjacent the stator vanes 204.

The hybrid casing 300 includes an example substrate 302, an example abradable material 304, and an example treatment 306. FIG. 3 also illustrates an example partial view of compressor rotor blades (e.g., rotor blades 202). An example tip clearance 308 is illustrated between the rotor blade 202 and the hybrid casing 300.

The example substrate 302 of FIG. 3 is made from ductile cast iron. However, any suitable material can be used to form the substrate 302 additionally or alternatively, such as Kevlar™, etc. The substrate 302 extends along an axial direction. The substrate 302 has an example first surface 310 and an example substrate thickness 312. The substrate thickness 312 is defined by a distance between the first surface 310 and extending radially outward to an example second surface 314 of the substrate 302. The first surface 310 of the substrate 302 surrounds the rotor blade(s) 202.

The example abradable material 304 is applied to the first surface 310 of the substrate 302. A thickness of the abradable material (also referred to as an abradable material thickness) 316 is defined by a distance from an example first abradable surface 318, which is at a same position as the first surface 310 of the substrate 302, and extending radially towards an example second abradable surface 320. A thickness of the hybrid casing 300 is defined by the substrate thickness 312 and the abradable material thickness 316. The abradable material thickness 316 is relatively thin compared to the substrate thickness 312. During operation of the turbine engine, the abradable material thickness 316 may change. For example, the tip of the rotor blade 202 may rub against the abradable material 304, thereby rubbing abradable material 304 coating away. In some examples, the abradable material thickness 316 is approximately 30-40 mils. However, the abradable material thickness 316 can be any thickness suitable to withstand abrasion during operation. In some examples, the abradable material thickness 316 is such that if the abradable material 304 rubs away, a thickness of the hybrid casing 300 remains relatively unchanged. In some examples, the abradable material thickness 316 is such that if the abradable material 304 rubs away, a depth 322 of a treatment 306 remains relatively unchanged.

The example treatment(s) 306 includes a plurality of grooves recessed into the substrate 302 having the abradable material 304. The treatment 306 is fabricated by producing the grooves into the abradable material 304 and the first surface 310 of the substrate 302. The example treatment 306 extends from the second abradable surface 320 of the abradable material 304, towards a surface of the substrate 302 beyond the first surface 310 (e.g., between the first surface 310 and outer surface 314). An example treatment depth 322 can be any suitable depth to achieve an aerodynamic benefit. In some examples, a ratio of the treatment depth 322 to the abradable material thickness 316 is such that abrasion of the abradable material 304 will not affect the aerodynamic benefits of the treatment 306.

The treatment 306 of the hybrid casing 300 can have any suitable configuration, as described below. In the illustrated example of FIG. 3, the treatment 306 includes grooves that are quadrilateral in shape. However, the shape of the treatment 306 can include one or more grooves. Further, the treatment 306 can be any suitable shape, including circumferential groove(s), axial slot(s), semi-circular slot(s), u-shape slot(s), s-shape(s), etc. In some examples, the treatment 306 includes a plurality of grooves that are substantially similar. However, the grooves may differ in some examples. In the illustrated example of FIG. 3, the treatment 306 extends along an axial direction of the hybrid casing 300. Further, the treatment 306 includes recessed grooves that are evenly spaced in the radial and circumferential direction. However, the treatment 306 can extend in any suitable direction. For example, the treatment 306 may be annular and extend continuously about the axis of the compressor (e.g., circumferential groove(s)).

Figure 4:
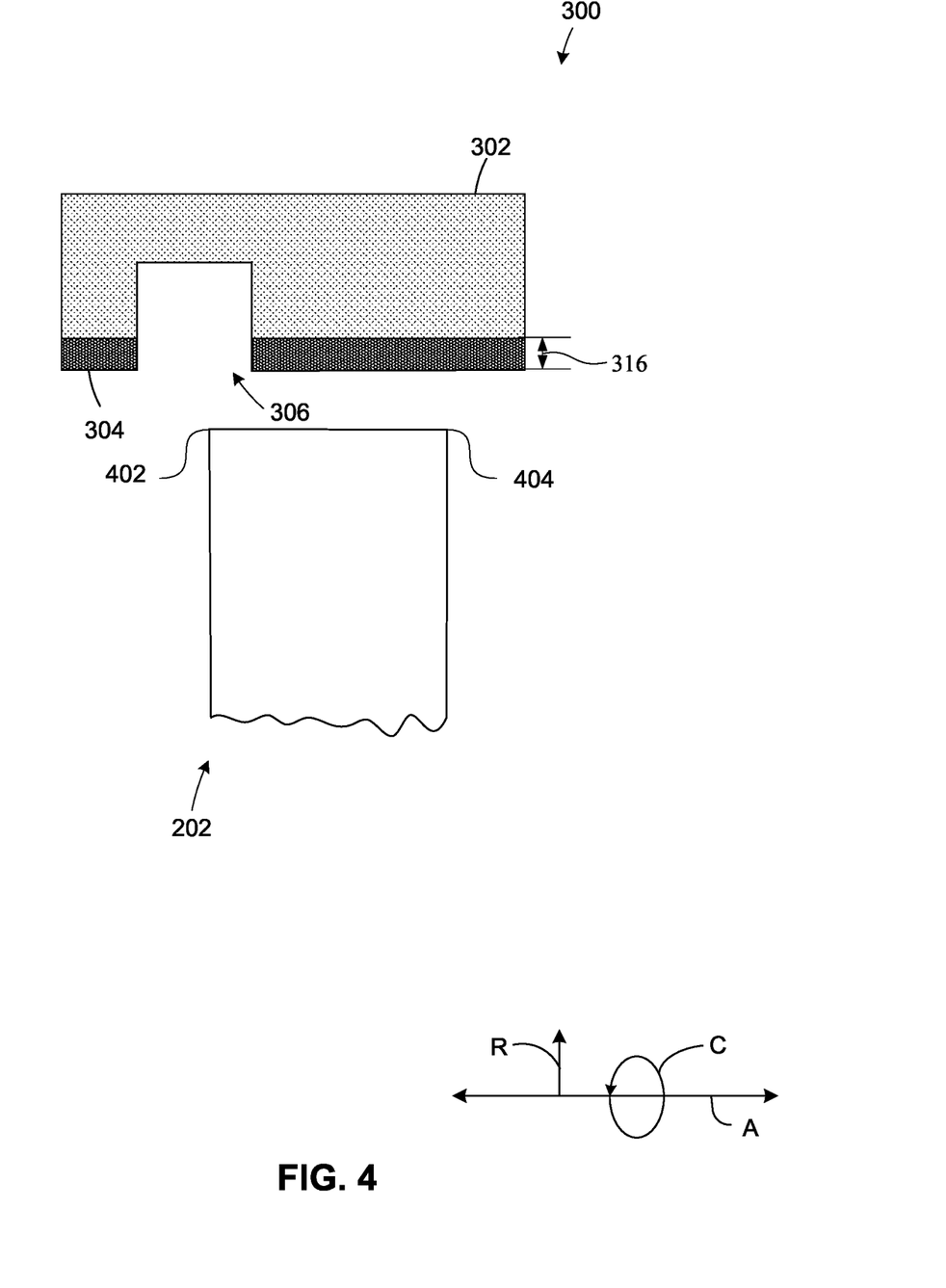
FIG. 4 is partial side view of the example hybrid casing FIG. 3.

FIG. 4 is side view of the example hybrid casing 300 of FIG. 3 taken along the line A-A of FIG. 3. The hybrid casing 300 includes the example substrate 302, the example abradable material 304, and the example treatment 306. FIG. 4 also illustrates a side view of the example rotor blade 202 of FIG. 3. In operation, the rotor blade 202 spins at a high speed in a circumferential direction. Accordingly, the rotor blade 202 has an example leading edge 402, which is the upstream edge of the blade, and an example trailing edge 404, which is the downstream edge of the blade. As illustrated, the treatment 306 is manufactured at a section of the hybrid casing 300 where the leading edge 402 of the rotor blade 202 operates. In some examples, the treatment 306 may occupy portions of the hybrid casing 300 at the trailing edge 404 and/or portions of the hybrid casing 300 between the leading edge 402 and trailing edge 404. In some examples, the treatment 306 extends upstream of the leading edge 402. In additional or alternative examples, the treatment 306 extends downstream of the trailing edge 404.

In the illustrated example of FIG. 4, the thickness 316 of the abradable material 304 is constant. However, the thickness 316 of the abradable material 304 may vary in some examples, as illustrated below in connection with FIG. 5. For example, the leading edge 402 of the rotor blade 202 may have the highest performance derivative of a compressor. Accordingly, the thickness 316 of the abradable material 304 may be larger near the leading edge 402 of the rotor blade 202 when compared to the trailing edge 404 in some examples.

Figure 5:
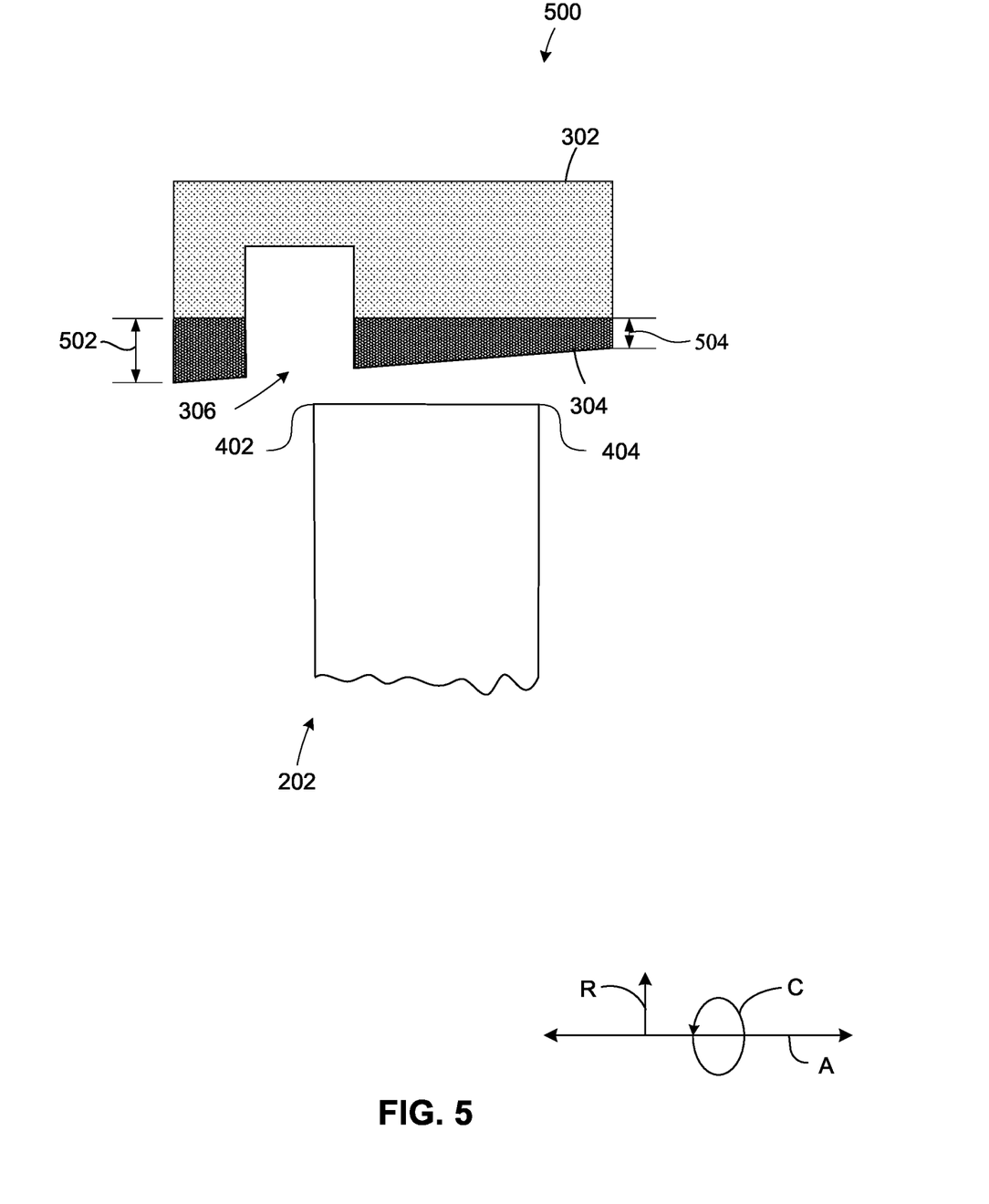
FIG. 5 is a partial side view of another example hybrid casing with an abradable material and treatment in accordance with teachings of this disclosure.

FIG. 5 is an illustration of another example hybrid casing 500 in accordance with the teachings of this disclosure. FIG. 5 includes an example substrate (e.g., substrate 302), an example abradable material (e.g. abradable material 304), an example treatment (e.g., treatment 306), and an example rotor blade (e.g., rotor blade 202). The rotor blade 202 has a leading edge (e.g., leading edge 402) and a trailing edge (e.g., trailing edge 404). The example hybrid casing 500 is similar to the hybrid casing 300 of FIGS. 3 and 4. However, the example hybrid casing 500 of FIG. 5 has an abradable material 304 that is thicker near the portion of the hybrid casing 500 where the leading edge 402 of the rotor blade 202 operates. As illustrated, a leading edge thickness 502 of the abradable material 304 is larger than a trailing edge thickness 504 of the abradable material 304. The abradable material 304 is thicker near the leading edge 402 and changes radius axially gradually (e.g., slopes, slants, etc.) towards the trailing edge 404 section of the hybrid casing 500.

Figure 6:
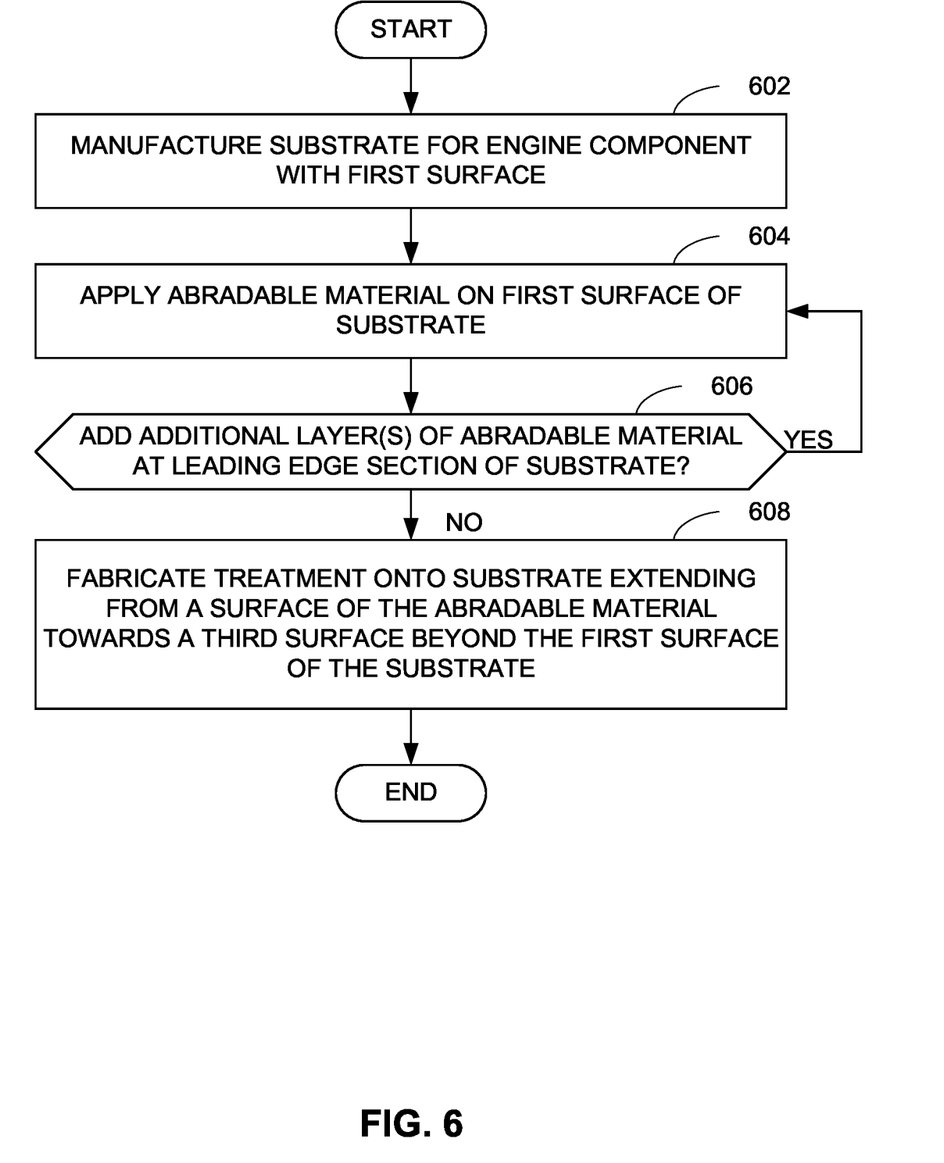
FIG. 6 is a flowchart diagram representative of an example method of manufacturing a hybrid engine component with an abradable material and treatment in accordance with the teachings of this disclosure.

FIG. 6 is a flowchart representative of an example method 600 to manufacture a hybrid engine component with an abradable material and treatment including the hybrid casing of FIGS. 3-5. In some examples, the method 600 begins at block 602 where an example substrate (e.g., example substrate 302) is manufactured for a hybrid engine component (e.g., hybrid casing 300, 500). The hybrid casing 300, 500, for example, may include an example first surface (e.g., first surface 310) and an example second surface (e.g., second surface 314). The substrate 302 may be manufactured using a die casting process. In some examples, the method 600 begins at block 604 (e.g., in examples in which a substrate is already provided). At block 604, an example abradable material (e.g., abradable material 304) is applied to the first surface 310 of the substrate 302. For example, the abradable material 304 can be thermally sprayed, sprayed by electron beam physical vapor deposition (EBPVD), etc. The method then inquires whether to add additional layers of abradable material 304 where an example leading edge (e.g., leading edge 402) of a rotor blade 202 interacts with the first surface 310 of the substrate 302. (Block 606). If the answer to block 606 is NO, the method moves to block 608. If the answer to block 606 is YES, then block 604 repeats to spray an additional layer of abradable material 304 at the section of the hybrid casing 300, 500 where the leading edge 402 of the rotor blades 202 interact. Blocks 604 and 606 repeat until a desired amount of abradable material 304 is applied. In additional or alternative examples, an intelligent spray is used that sprays the abradable material 304 thicker at the leading edge 402. In such examples, block 606 may be skipped. At block 608, a treatment 306 is fabricated onto the substrate 302, extending from an example second abradable surface (e.g., second abradable surface 320) of the abradable material 304 towards a third surface of the substrate 302 beyond the first surface 310 (e.g., between the first surface 310 of the substrate 302 and the second surface 314 of the substrate 302). The treatment 306 can be fabricated using any suitable method, including a subtractive manufacturing process such as milling, drilling, etc. and/or other suitable methods such as chemical etching, etc.

Although each example hybrid casing 300, 500 disclosed above has certain features, it should be understood that it is not necessary for a particular feature of one example hybrid casing 300, 500 to be used exclusively with that example. Additionally or alternatively, although each example abradable material 304 disclosed above has certain features, it should be understood that it is not necessary for a particular feature of one example abradable material 304 to be used exclusively with that example. Additionally or alternatively, although each example treatment 306 disclosed above has certain features, it should be understood that it is not necessary for a particular feature of one example treatment 306 to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. Further, example features disclosed for the hybrid casing 300, 500 may additionally or alternatively be applied to another example hybrid engine component, such as a hybrid hub, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus, and articles of manufacture have been disclosed for a hybrid engine component with an abradable material and treatment. In examples disclosed herein, a substrate has a first surface in a region near a blade (e.g., a rotor blade and/or a stator vane). In examples disclosed herein, an abradable material is applied to the first surface of the substrate. In examples disclosed herein, a treatment is applied to the engine component having the abradable material. Examples disclosed herein provide improved tip clearance management in part due to the abradable material coating. Examples disclosed herein enable improved aerodynamic performance in part due to the treatment. Examples disclosed herein protect a blade tip from damage by enabling the tip to rub away the abradable material when tip clearance is minimal. Accordingly, examples disclosed herein enable improved operability and efficiency of a turbine engine, enable aerodynamic benefits, improve stall margin, and control tip clearance.

Further aspects of the present disclosure are provided by the subject matter of the following clauses:

Example 1 includes an engine component comprising substrate having a first thickness and defining at least a first substrate surface, the substrate extending along an axial direction, an abradable material on the first substrate surface, the abradable material defining a first abradable material surface, a second abradable material surface spaced radially apart from the first abradable material surface and defining a second thickness, a treatment, the treatment extending from the first abradable material surface through at least a portion of the first thickness of the substrate.

Example 2 includes the engine component of any preceding clause, wherein the second thickness of the abradable material is smaller than a first thickness of the substrate.

Example 3 includes the engine component of any preceding clause, wherein the component is a casing, the component to surround rotor blades, ones of the rotor blades having a leading edge and a trailing edge.

Example 4 includes the engine component of any preceding clause, wherein the abradable material has a first thickness at a section of the component in which a leading edge of a rotor blade operates and a second thickness at a portion of the component in which a trailing edge of the rotor blade operates, the first thickness larger than the second thickness, the thickness of the abradable material varies along the axial direction from the first thickness to the second thickness.

Example 5 includes the engine component of any preceding clause, wherein the abradable material is a thermally sprayed abradable material.

Example 6 includes the engine component of any preceding clause, where the abradable material includes at least one of nickel-graphite or cobalt-nickel-chromium-aluminum-yttrium (CoNiCrAlY).

Example 7 includes the engine component of any preceding clause, wherein the substrate is within a portion of at least one of a fan section of a turbine engine, a compressor section of the turbine engine, or a turbine section of the turbine engine.

Example 8 includes the engine component of any preceding clause, wherein the treatment includes fabricated grooves into the abradable material and the substrate.

Example 9 includes the engine component of any preceding clause, wherein the treatment of the abradable material is colinear with the treatment of the substrate.

Examples 10 includes a gas turbine engine comprising an array of rotor blades, ones of the array of blades having a leading edge and a trailing edge, an array of stator vanes, and an engine component including a substrate having at least a first surface and a substrate thickness, an abradable material on the first surface of the substrate, a thickness of the abradable material defined by a distance from a first abradable surface extending towards a second abradable surface, and a treatment.

Example 11 includes the gas turbine engine of any preceding clause, wherein the engine component has a thickness defined by the substrate thickness and a thickness of the abradable material.

Example 12 includes the gas turbine engine of any preceding clause, wherein the engine component has a first thickness corresponding to the engine component after the abradable material is applied and a second thickness corresponding to the engine component after abrasion of the abradable material, and wherein the abradable material has a thickness such that first thickness of the engine component and the second thickness of the engine component are substantially equal.

Example 13 includes the gas turbine engine of any preceding clause, wherein the abradable material is applied to the first surface by at least one of a thermal spray technique or an electron beam physical vapor deposition technique.

Example 14 includes the gas turbine engine of any preceding clause, wherein the treatment has a first depth corresponding to the engine component prior to abrasion of the abradable material and a second depth corresponding to the engine component after abrasion of the abradable material, and wherein the abradable material has a thickness such that the first treatment depth and the second treatment depth are substantially equal.

Example 15 includes the gas turbine engine of any preceding clause, wherein the engine component is a hub, and wherein the first surface is an outer surface of the hub, the first surface of the hub surrounded by the array of stator vanes.

Example 16 includes the gas turbine engine of any preceding clause, wherein the engine component is a casing, and wherein the first surface is an inner surface, the first surface of the casing to surround the array of rotor blades.

Example 17 includes the gas turbine engine of any preceding clause, wherein the abradable material has a first thickness at a section of the engine component in which a leading edge of a rotor blade operates and a second thickness at a portion of the engine component in which a trailing edge of the rotor blade operates, the first thickness larger than the second thickness, the thickness of the abradable material sloping from the first thickness to the second thickness.

Example 18 includes the gas turbine engine of any preceding clause, wherein the treatment includes a plurality of grooves fabricated radially into the abradable material and the first surface of the substrate.

Example 19 includes the gas turbine engine of any preceding clause, wherein the treatment of the abradable material is colinear with the treatment of the substrate.

Example 20 includes the gas turbine engine of any preceding clause, wherein the abradable material and treatments are applied to at least one of a fan section of a turbine engine, a front stage compressor of the turbine engine, or a rear stage compressor of the turbine engine.

Example 21 an engine component comprising substrate means, abradable means, and treatment means.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An engine component, comprising:
 a substrate having a first thickness and defined by a distance from a first substrate surface to a second substrate surface, the first substrate surface positioned radially inward relative to the second substrate surface, the substrate extending along an axial direction;
 an abradable material applied to the first substrate surface and defining (a) a first abradable material surface in contact with the first substrate surface to define an interface, and (b) a second abradable material surface spaced radially inward from the first abradable material surface; and a treatment including a groove having:
   a closed end within the substrate;
   an open end within the second abradable material surface; and
   lateral walls extending from the open end in the second abradable material surface, through the interface, to the closed end within the substrate, wherein a distance between the lateral walls is equal from the open end to the closed end.

2. The engine component of claim 1, wherein a second thickness of the abradable material is smaller than the first thickness of the substrate, the second thickness defined by a distance from the first abradable material surface to the second abradable material surface.

3. The engine component of claim 2, wherein the engine component includes a casing, the engine component to surround rotor blades, at least one rotor blade of the rotor blades to include a leading edge and a trailing edge.

4. The engine component of claim 3, wherein the abradable material has the second thickness at a section of the engine component in which the leading edge of the at least one rotor blade operates and a third thickness at a portion of the engine component in which the trailing edge of the at least one rotor blade operates, the second thickness larger than the third thickness, the abradable material varying from the first thickness to the second thickness along the axial direction.

5. The engine component of claim 1, where the abradable material includes at least one of nickel-graphite or cobalt-nickel-chromium-aluminum-yttrium (CoNiCrAlY) and wherein the abradable material is a thermally sprayed abradable material.

6. The engine component of claim 1, wherein the treatment of the abradable material is aligned and colinear with the treatment of the substrate.

7. A gas turbine engine comprising:
   an array of rotor blades; and
   an engine component including:
      a substrate having at least a first substrate surface and a first thickness;
      an abradable material having:
         a first abradable surface;
         a second abradable surface; and
         a second thickness defined between the first abradable surface and the second abradable surface, wherein the first abradable surface is in contact with the first substrate surface to define an interface; and
      a treatment separate from the abradable material, the treatment including a plurality of grooves fabricated radially into the abradable material, each groove having:
         an open end at the second abradable surface;
         a closed end opposite the open end, the closed end located in the substrate; and
         lateral walls defined between the open end and the closed end, the lateral walls extending radially outward from the second abradable surface through at least a portion of the first thickness such that the lateral walls are continuous at the interface, wherein a distance between the lateral walls is consistent from the open end to the closed end.

8. The gas turbine engine of claim 7, wherein the engine component has a component thickness defined by the first thickness and the second thickness.

9. The gas turbine engine of claim 8, wherein the engine component has a first component thickness corresponding to the engine component after the abradable material is applied and a second component thickness corresponding to the engine component after abrasion of the abradable material, and wherein the abradable material has a third thickness such that first component thickness of the engine component and the second component thickness of the engine component are substantially equal.

10. The gas turbine engine of claim 7, wherein the treatment has a first depth corresponding to the engine component prior to abrasion of the abradable material and a second depth corresponding to the engine component after abrasion of the abradable material, and wherein the second thickness of the abradable material is such that the first depth and the second depth are substantially equal.

11. The gas turbine engine of claim 7, wherein the engine component includes a hub, and wherein the first substrate surface is an outer surface of the hub, the first substrate surface of the hub surrounded by an array of stator vanes.

12. The gas turbine engine of claim 7, wherein the engine component includes a casing, and wherein the first substrate surface is an inner surface, the first substrate surface of the casing to surround the array of rotor blades.

13. The gas turbine engine of claim 7, wherein a first rotor blade of the array of rotor blades has a leading edge and a trailing edge, and the abradable material has the second thickness at a section of the engine component in which the leading edge of the first rotor blade operates and a third thickness at a portion of the engine component in which the trailing edge of the first rotor blade operates, the second thickness larger than the third thickness, the abradable material sloping from the second thickness to the third thickness.

14. An engine component comprising:
   substrate means;
   abradable means positioned on the substrate means; and
   treatment means, wherein the treatment means include a groove recessed into the substrate means having the abradable means positioned thereon, the groove including a closed end within the substrate means, an open end opposite the closed end, the open end positioned in the abradable means, and lateral walls defined between the open end and the closed end, wherein a distance between the lateral walls is the same from the open end to the closed end.

15. The engine component of claim 1, wherein the groove is a first groove, the treatment further including a second groove, and wherein the treatment includes one of a circumferential groove, an axial slot, a semi-circular slot, a u-shape slot, or an s-shape slot.

16. The gas turbine engine of claim 7, wherein the groove extends in at least one of a circumferential direction or an axial direction.

17. The engine component of claim 1, wherein each lateral wall includes a first portion formed in the substrate and a second portion formed in the abradable material, the first portion adjacent the second portion and adjacent the interface.

18. The gas turbine engine of claim 7, wherein a depth of the groove is measured between the open end and the closed end, the depth of the groove greater than the second thickness.

19. The gas turbine engine of claim 7, wherein a respective entrance to each groove is unimpeded by the abradable material.

20. The engine component of claim 1, wherein the open end includes one opening.

21. The gas turbine engine of claim 7, wherein the lateral walls further extend circumferentially from the second abradable surface.

22. The engine component of claim 14, wherein the substrate means includes an inner surface, the abradable means is positioned on the inner surface of the substrate means.

\* \* \* \* \*